United States Patent [19]

Shibayama et al.

[11] Patent Number: 4,807,162

[45] Date of Patent: Feb. 21, 1989

[54] TEACHABLE INSPECTION CONTROLLER

[75] Inventors: Masahiko Shibayama, Shiga; Umekichi Kai, Kyoto; Hideki Yamamoto, Kameoka, all of Japan

[73] Assignee: Omron Tateisi Electronics Co., Kyoto, Japan

[21] Appl. No.: 947,438

[22] Filed: Dec. 29, 1986

[30] Foreign Application Priority Data

Dec. 27, 1985 [JP] Japan .......................... 60-204577[U]
Dec. 28, 1985 [JP] Japan .......................... 60-204142[U]

[51] Int. Cl.⁴ ...................... G06F 15/20; G01N 21/16
[52] U.S. Cl. ..................................... 364/552; 364/507; 364/473; 364/550; 340/674; 356/240
[58] Field of Search ............ 364/506, 507, 550, 552, 364/555, 559, 468, 469, 473; 356/388, 394, 426–428, 239, 240; 340/612, 613, 618, 619, 673, 674, 676, 679

[56] References Cited

U.S. PATENT DOCUMENTS

| | | | |
|---|---|---|---|
| 4,338,671 | 7/1982 | Korytkowski et al. | 364/550 |
| 4,476,533 | 10/1984 | Daudt et al. | 364/552 |
| 4,683,542 | 7/1987 | Taniguti | 364/550 |
| 4,692,299 | 9/1987 | Crew et al. | 364/550 |
| 4,695,965 | 9/1987 | Fujita et al. | 364/550 |
| 4,718,025 | 1/1988 | Minor et al. | 364/550 |

Primary Examiner—Parshotam S. Lall
Assistant Examiner—Brian M. Mattson
Attorney, Agent, or Firm—Stevens, Davis, Miller & Mosher

[57] ABSTRACT

An inspection controller for an object includes a plurality of sensors for providing a set of input signal states representing characteristics of the object, a plurality of output terminals, a memory for storing a set of output signal states corresponding to each possible set of input signal states of the sensors, and a control device for selecting a set of output signal states stored in the memory and producing a set of output signal states at the output terminals corresponding to a set of the input states. A teaching command device is also included for commanding the writing of a set of output signal states corresponding to a predetermined set of input signal states in the memory; and a second control device for writing into the memory the set of input signal states obtained from the sensors and the output signal states on the output terminals selected by the output terminal selecting device in such a manner that the two sets of data correspond to each other according to the status of the teaching command device, the selecting device, and the write command device.

8 Claims, 7 Drawing Sheets

TEACHABLE INSPECTION CONTROLLER

BACKGROUND OF THE INVENTION

The present invention relates to an inspection controller for performing inspection such as high speed inspection of filled and labeled bottles and the like, and more particularly relates to such an inspection controller, which is teachable by an operator so as to reduce the load of providing the programming therefor.

Such a controller for high speed inspection typically comprises a plurality of sensors, a plurality of output terminals, memory for storing output states corresponding to the input states of the sensors, and a control means for selecting the output states stored in the memory and producing output on the output terminals corresponding to the output states. And such a controller may typically be used for inspecting a sequence of bottles, which are filled with liquid, capped and labeled, as they are continually conveyed by a belt conveyor, to test whether or not they contain a proper volume of liquid or not, whether or not they are properly capped, and whether or not they are properly labeled, using such a plurality of sensors.

According to a conventional controller for high speed inspection having such a structure, setting up the input state of the sensors corresponding to the various ones of the output states, it has been necessary for the operator to determine the input state of each of the sensors and to program the controller according to these input states. In other words, the operator is required to do programming individually for each possible output state so as to set up a first output state corresponding to a first input state, a second output state corresponding to a second input state, a third output state corresponding to a third input state and so on.

In the case of the above mentioned example, the controller is so programmed that it produces an output on an output terminal corresponding to the normal state when the input of the sensor for detecting the arrival of the object (i.e. the bottle) to be inspected at the point for inspection is "H", the input of the liquid volume sensor is "H", the input of the cap detection sensor is "H", and the input of the label detection sensor is "H". Further, it is so programmed, for instance, that an output is produced on the terminal corresponding to abnormal liquid volume when the input from the liquid volume sensor alone is "L", and that an output is produced on both the terminals corresponding both to improper liquid volume and to improper labeling when the inputs both from the liquid volume sensor and from the label detection sensor are "L".

Therefore, according to a conventional controller for inspection, there were a large number of steps that were required to be programmed by the operator, and much labor and time were required for performing such programming.

SUMMARY OF THE INVENTION

The inventors of the present invention have considered the various problems detailed with a view toward perfecting such an inspection controller.

Accordingly, it is the primary object of the present invention to provide an inspection controller which avoids the problems detailed above.

It is a further object of the present invention to provide such an inspection controller which can be easily programmed.

It is a further object of the present invention to provide such an inspection controller which can be automatically programmed.

It is a further object of the present invention to provide such an inspection controller which permits automatic programming for determining the input states of a plurality of sensors corresponding to various output states during the preparatory test run phase of plant operation.

It is a further object of the present invention to provide such an inspection controller which can reduce the burden upon the operator.

According to the most general aspect of the present invention, these and other objects are atained by an inspection controller, comprising a plurality of sensors, a plurality of output terminals, memory for storing output states corresponding to the input states of the sensors and a control means for selecting an output state stored in the memory and producing an output state on the output terminals corresponding to each of the input states, furhter comprising: a means for commanding teaching; a means for selecting the output terminals; a means for commanding writing for the memory; and a second control means for writing into the memory the data obtained from the sensors and the output data on the output terminals selected by the output terminal selecting means in such a manner that the two sets of data correspond to each other according to the states of the teaching command means, the selecting means and the write command means.

According to such an inspection controller as specified above, when a learning operation is conducted with the teaching command means, the output terminal selection means and the write command means are activated, and data corresponding to the state of the object of the inspection is inputted to the sensors. The second control means writes the input data and the output data on the output terminals selected by the output terminal selection means into the memory so as to have a certain correspondence between the two sets of the data.

In other words, the programming for setting up the input states of the sensors corresponding to various output states is automatically conducted during the course of the learning operation.

Thus, according to this aspect of the present invention, since the programming of the input states of a plurality of sensors can be performed automatically, the burden on the operator is substantially reduced as opposed to the conventional controllers which required setting up and programming of the input states of the sensors for each individual input state.

A further and subsidiary problem that occurs is as follows. Such a controller is typically used for inspecting a plurality of bottles, which are filled with liquid, capped and labeled, as they are continually conveyed by a belt conveyor if they contain a proper volume of liquid or not, if they are properly capped or not and if they are properly labeled or not using a plurality of sensors. During such an actual operation, the first control means plays the major role.

And, prior to the actual operation, in programming I/O data, a learning operation is conducted while hte teaching command means, the selecting means and the write command means are in action. Then, the data corresponding to the state of the object of inspection is inputted into a plurality of sensors. The second control means writes the I/O data and the output data on the output terminals selected by the output terminal selecting means into the memory in such a manner that the two sets of data correspond to each other. In other words, during such a learning operation, the programming for setting up the input states of the sensors corresponding to various output conditions is automatically conducted. Thus, the operator is freed from the trouble of determining each individual state of the sensors and, thereafter, doing the programming for each individual input state. However, according to a controller for high speed inspection having such a structure, if the mounting of the sensors or the sensitivity adjustment of the sensors is improper, in the automatic programming during a learing operation, even when the input data of the I/O data for a good product which was stored earlier is identical to the input data of the I/O data for a bad product which is to be stored in the memory afterwards, both the I/O data is stored in the memory and the two teaching conditions are interpreted to be identical even though they are two different conditions. And, since the two conditions are stored in the memory as being correct, detection error could occur during an actual operation and the number of teaching conditions to be stored may be limited due to the wasteful utilization of the memory area.

Thus, a subsidiary object of the present invention is to warn the operator when different teaching conditions are likely to be confused to be identical in automatic programming during a learning operation due to improper mounting of the sensors or improper sensitivity adjustment to advise him or her of the improper mounting of the sensors or improper sensitivity adjustment, and, by clearing the teaching conditions which have already been stored in the memory and could cause misdetection to rationalize the automatic programming and to increase the use efficiency of the memory area.

According to this, according to a particular specialization of the present invention, the above and other objects may more particularly be accomplished by such an inspection controller as specificed above, further comprising: a teaching condition agreement determining means for determining the agreement between the input data of the I/O data for writing and the input data of the I/O data which has already been written into the memory and, in case of disagreement, for outputting an action signal for the second control means; and: a third control means for outputting an error signal in case of an agreement result from the teaching condition agreement determining means and for clearing the already stored and agreed I/O data from the memory. In this case, when a learning operation is conducted with the teaching command means, the output terminal selection means and the write command means activated on a good product, data corresponding to the state of the object of the inspection is inputted to the sensors. The second control means writes the I/O data for writing comprising the input data and the output data for a good product on the output terminals selected by the outpu terminal selection means into the memory as teaching conditions, and this becomes the stored I/O data. On the other hand, when a learning operation is conducted on an object having a certain defect, the data corresponding to the defect of the product is inputted into a plurality of sensors. The I/O data consisting of this input data and the output data indicating the identity or the location of the defect is inputted in the teaching condition agreement determining means. The teaching condition agreement determining means determines whether the input data for the I/O data for writing agrees with the input data of the I/O data stored in the memory, or not. In case of disagreement, or, in other words, if the stored input data on a good product disagree with the input data for writing of an object having a defect at a certain location, the teaching condition agreement determination means outputs an action signal to the second control means and, therefore, the new I/O data of the object having the defect at the certain location is stored in the memory as the teaching condition. But, if the new input data for writing agree with the stored input data, the third control means outputs an error signal and the store I/O data in the memory is cleared from the memory.

Thereby, since the operator is warned if different teaching conditions are likely to be confused as identical in automatic programming during a learning operation due to improper mounting of the sensors or improper sensitivity adjustment by outputting an error signal for advising him or her of the improper mounting or the improper sensitivity adjustment of the sensors, he or she can accordingly correct the improper mounting or the improper sensitivity adjustment of the sensors and can do the automatic programming anew by starting another learning operation. This allows the proper performance of automatic programming. And, since the teaching conditions which originated from the input data of the already stored and agreed I/O data and a cause of misdetection are deleted, the use efficiency of the memory area can be enhanced.

BRIEF DESCRIPTION OF THE DRAWINGS

The present invention will now be described with respect to the preferred embodiments thereof, and with reference to the illustrative drawings appended hereto, which, however, are provided for the purposes of explanation and exemplification only, and are not intended to be limitative of the scope of the present invention in any way since this scope is to be delimited solely by the accompanying claims. With relation to the figures, spatial terms are to be understood as referring only to the orientation on the drawing paper of the illustrations of the relevant parts, unless otherwise specified: like reference numerals, unless otherwise so specified, denote the same parts and gaps and spaces and flow chart steps and so on in the various figures relating to one preferred embodiment, and like parts and gaps and spaces and flow chart steps and so on in figures relating to different preferred embodiments.

DESCRIPTION OF THE PREFERRED EMBODIMENTS

The present invention will now be described with reference to the preferred embodiments thereof, and with reference to the figures.

THE FIRST PREFERRED EMBODIMENT

FIGS. 1 through 6 relate to the first preferred embodiment of the inspection controller of the present invention, which is an inspection controller for testing the acceptability of a sequence of filled bottles that are being forwarded down an assembly line.

CONSTRUCTION

Figure 1:
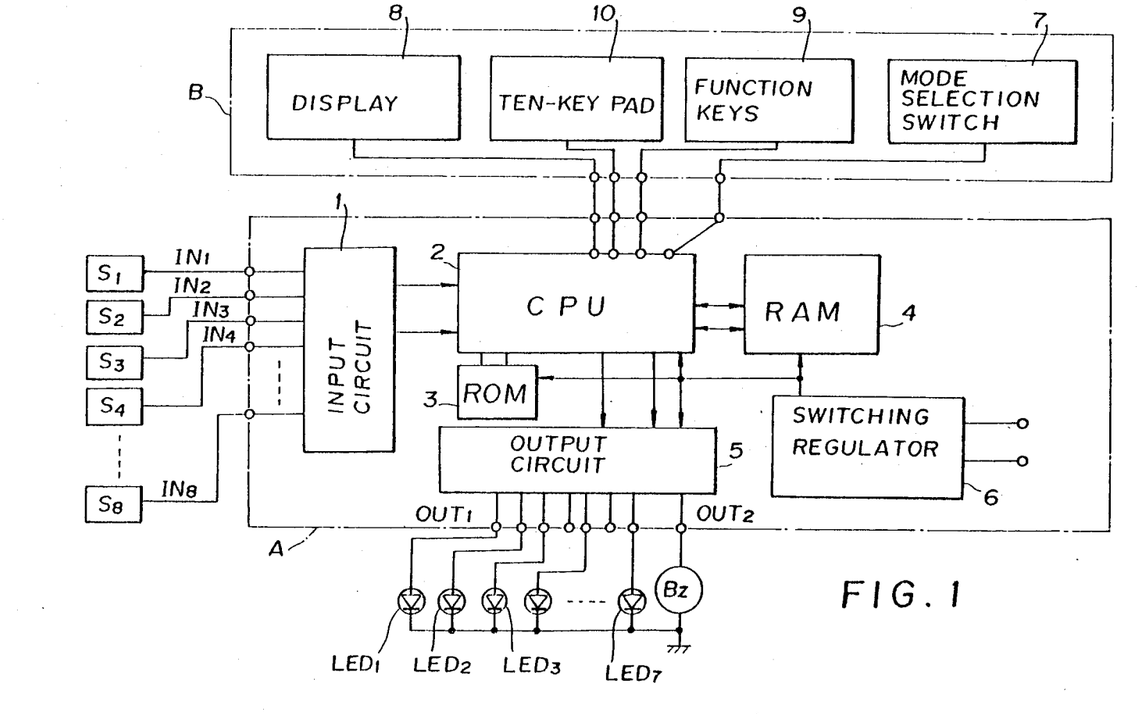
FIG. 1 is a schematic block diagrammatical circuit diagram of the first preferred embodiment of the inspection controller of the present invention.
Figure 2:
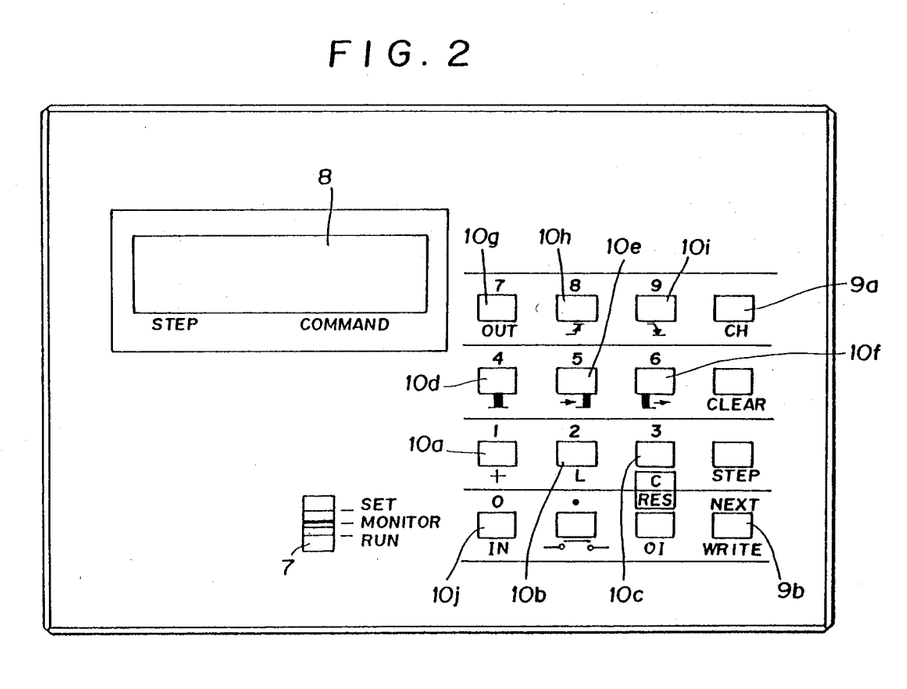
FIG. 2 is a plan view of a setting unit of said first preferred embodiment of the inspection controller of the present invention.

In the first preferred embodiment of the inspection controller of the present invention, shown in schematic circuit block diagrammatical view in FIG. 1, and a setting unit of which is shown in plan view in FIG. 2, the reference numeral 1 denotes an input circuit which is in turn connected to a microprocessor, i.e. a CPU or central processing unit, 2. This central processing unit 2 is connected to a ROM (read only memory) unit 3, which is for storing system programs and constants and the like, to a RAM 4 of a non-volatile type which is for storing the intermediate results of processing such as variables and the like, and to an output circuit 5 which, in this exemplary preferred embodiment, has eight output terminal. A switching regulator 6 is connected to the central processing unit 2, the ROM 3, the RAM 4, and the output circuit 5. This switching regulator 6 is supplied with AC power from an AC primary power source (from about 100 V to about 240 V) and not only supplies the necessary DC stabilized power to the various other devices named, but also detects the occurrence of the power off condition and protects the system memory. Seven of the eight output terminals of the output circuit 5 are connected to light emitting diodes (LEDs) denoted as LED1 through LED7, and further the other one of the output terminals of the output circuit 5 is connected to an electronic buzzer denoted as Bz.

If, as is considered preferable, photosensors are used for the sensors S1 through S8, whose input signals are fed to the input circuit 1, then the input circuit 1 is preferred to include photo-couplers or the like for providing isolation from external noises. The output circuit 5 may also include similar photo couplers or the like for providing isolation from external noises.

The portion of the device shown in FIG. 1 as being surrounded by a single chain dotted line and denoted as "A" corresponds to the main body unit of this first preferred embodiment of the inspection controller of the present invention, while the portion surrounded by a single chain dotted line and denoted as "B" constitutes a setting unit, and is detachably connected to the central processing unit 2 of the main body unit A. This setting unit B, as shown in FIG. 2, is provided with a mode selection switch 7 which can be set for selecting any one mode from "set mode", "monitor mode", and "run mode", and also is provided with a LCD type display 8, various function keys 9, and a ten key pad 10.

Among these function keys 9 there is included a so-called teach key 9a, and this teach key 9a corresponds to the teaching command means as described in the claims. And further among these function keys 9 there is included a so-called write key 9b, and this write key 9b corresponds to the write command means as described in the claims. Further, the RAM 4 corresponds to the "memory for storing the output states corresponding to the input states of the sensors" S1 through S8, as described in the present claims.

The central processing unit 2 combines the functions of the first control means and the second control means as described in the claims. In other words, the central processing unit 2 includes: (1) the first control means, which has the operative function of selecting, as part of its actual operation, from the output states stored in the RAM 4 according to the data received from the sensors S1 through S8 and producing output on the output terminals corresponding to the output states; and (2) the second control means, having the operative function of writing, as a part of automatic programming, the data from the sensors S1 through S8 and the output data for the output terminal as selected on the ten key pad 10, so as to have a certain mutual association, into the RAM 4.

ACTION DURING ACTUAL OPERATION

Figure 3:
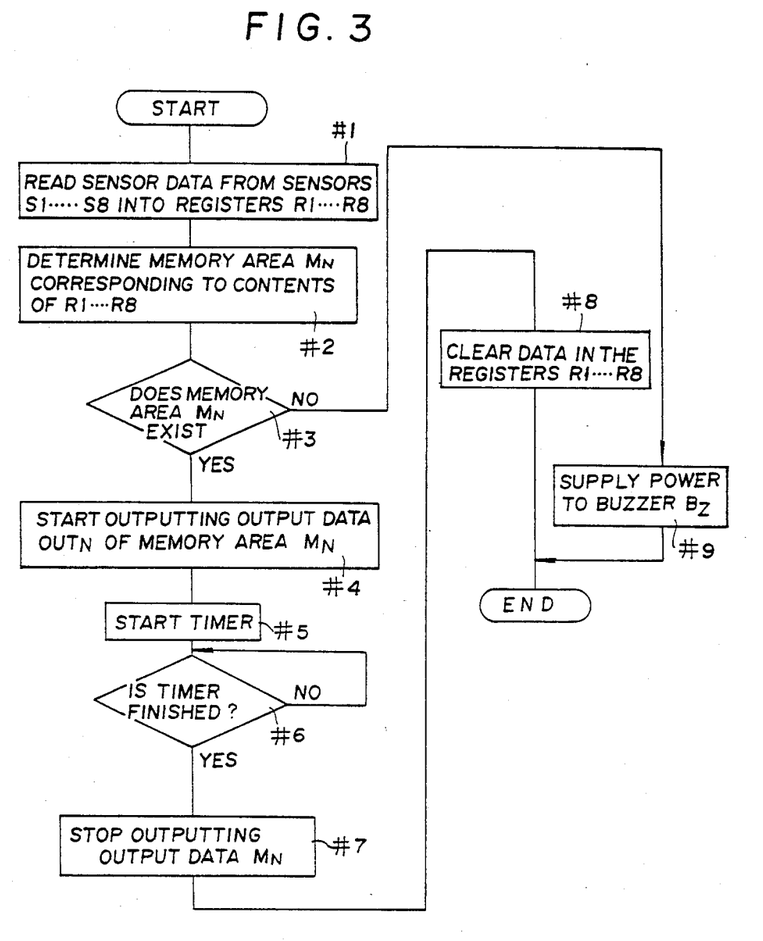
FIG. 3 is a partial flow chart for illustrating a portion of a program stored in and obeyed by a mirocomputer incorporated in the first preferred embodiment inspection controller of FIG. 1, during actual operation for checking bottles.

Now, in FIG. 3, a fragmentary flow chart is shown for a portion of the aforementioned control program which directs the actual operation of the central processing unit 2, according to this first preferred embodiment of the inspection controller of the present invention. This flow chart will now be explained. It should be understood that the actual steps of the program executed by the central processing unit 2 for implementing this flow chart are not particularly disclosed in this specification; such programming may be performed in a per se conventional way according to the flow chart of FIG. 3, and no particular details thereof are shown or suggested in this specification, since various possibilities for the details thereof can be easily supplemented, as appropriate, by one of ordinary skill in the programming arts, when based upon the functional disclosures set out in this specification.

Before starting the FIG. 3 flow chart, there have already been stored in appropriate locations in the RAM 4 output states corresponding to the input states of the sensors S1 through S8.

The mode selection switch 7 is set to the "RUN" position, and this starts the action of the FIG. 3 program from the step #1.

In the step #1, input data is obtained from the sensors S1 through S8, and this data is stored in individual registers (or memory locations) R1 through R8 respectively; and then the flow of control passes next to step #2.

In step #2, a memory area Mn of the RAM 4 corresponding to the data stored in the registers R1 through R8 is determined, and then the flow of control passes next to the decision step #3.

In the decision step #3, a decision is made as to whether or not this determined memory area Mn actually does exist in the RAM 4. If the result of this decision is NO, so that the memory area Mn does not in fact exist, then the flow of control passes next to step #4, to sound the buzzer Bz to alert the operator of this error condition; but, if the result of this decision is YES, so that the memory area Mn in fact does exist, then the flow of control passes next to step #5.

In step #4, as specified above, the buzzer Bz is activated in order to alert the operator, and then the flow of control passes next to leave this program fragment without doing anything further.

On the other hand, if the result of this step #3 decision is YES, so that the memory area Mn does in fact exist, then, in step #4, the output data OUTn of this corresponding memory area Mn is started to be supplied to a corresponding one of the light emitting diodes LEDn via the output circuit 5, so as to light up this light emitting diode LEDn, and then the flow of control passes next to step #5.

In step #5, a timer is started, and then the flow of control passes next to the decision step #6.

In the decision step #6, a decision is made as to whether or not the predetermined time interval to be timed by the timer has elapsed as yet. If the result of this decision is YES, so that the timer has timed its full predetermined time interval, then the flow of control passes next to step #7; but, if the result of this decision is NO, so that as yet the timer has not timed its full predetermined time interval, then the flow of control passes next to this decision step #6 again, to loop around in a tight repetitive loop until in fact the timer does come thus to time its full predetermined time interval.

In step #7, at which point it is determined that the timer has completed timing its predetermined time interval following step #5, then the outputting of the output data OUTn of the memory area Mn to the corresponding one of the light emitting diodes LEDn via the output circuit 5 is terminated, and accordingly the lighting up of this light emitting diode LEDn ceases; and then the flow of control passes next to step #8.

In step #8, the input data stored in the registers R1 through R8 is cleared, and then the flow of control passes next to leave this program fragment without doing anything further.

Figure 4:
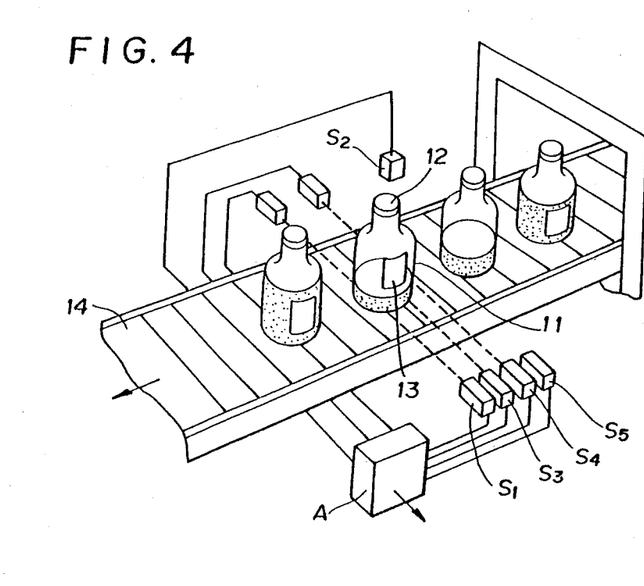
FIG. 4 is a perspective view illustrating how this inspection controller is used for inspecting a sequence of bottles.

Now, the above described action will be described in a more concrete manner with particular reference to FIGS. 4 and 5. FIG. 4 is a perspective view showing the manner in which the acceptability of each one of a series of bottles is tested, while FIG. 5 is a time chart for explaining the sequence of actions.

In this case, the functions of the eight sensors S1 through S8 are as follows: the sensor S1 detects the arrival of a bottle 11; the sensor S2 detects the presence of a cap 12 on the bottle 11; the sensor S3 detects whether or not the level of the liquid in the bottle 11 is correct; the sensor S4 detects the presence of a label 13 on the bottle 11; and the sensor S5 detects whether the label 13 is correctly attached to the bottle 11, or not. The sensors S6 through S8 are not used in this exemplary implementation.

Figure 5:
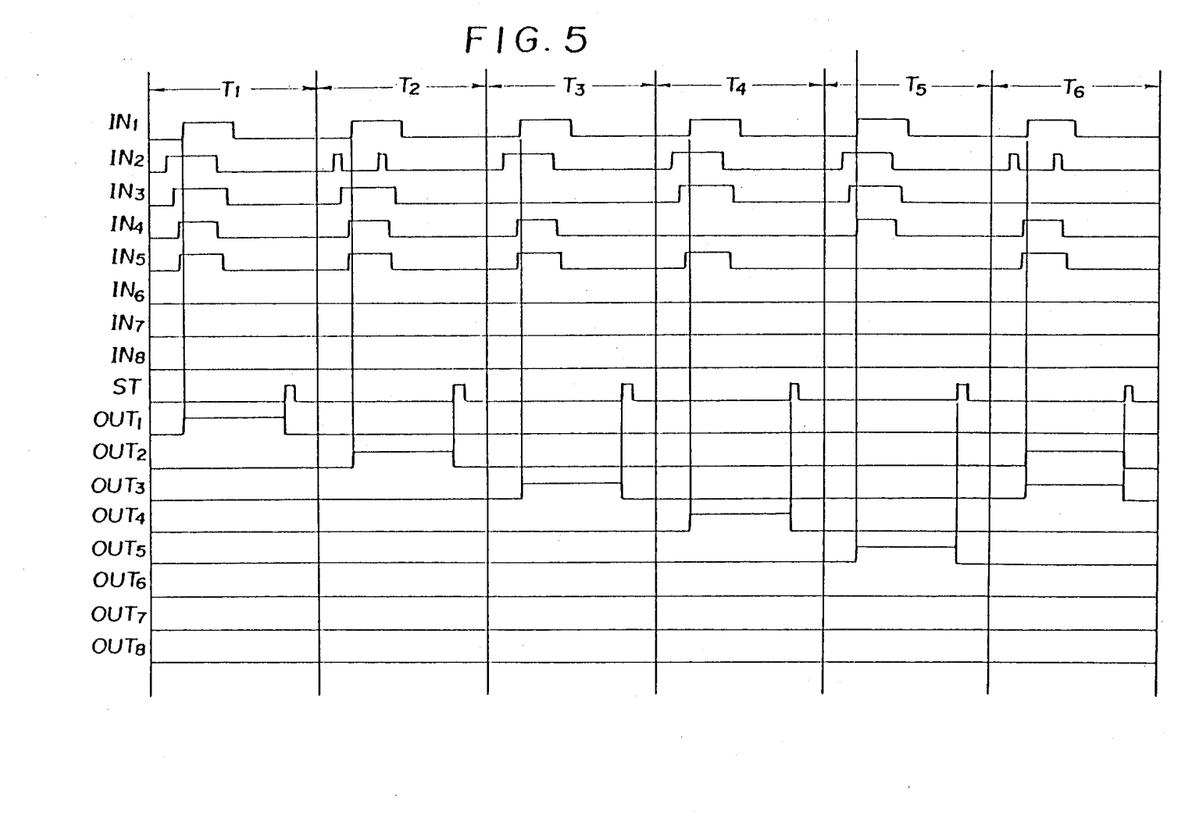
FIG. 5 is a time chart for illustrating the operation of this preferred embodiment of the inspection controller of the present invention durning an exemplary episode of bottle checking operatino.

In the FIG. 5 time chart, IN1 through IN8 respectively denote the input signals received by the central processing unit 2 from the sensors S1 through S8, and similarly OUT1 through OUT8 denote the output signals supplied by the central processing unit 2 to the light emitting diodes LED1 through LED7 and to the electronic buzzer Bz.

The input to the central processing unit 2 from the sensor S1 for detecting the arrival of a bottle 11 is delayed.

During the first exemplary operational episode, i.e. during the time interval T1 in which exemplary case a bottle 11 is to be inspected which in fact is in good order, at the rising edge of the input signal IN1 from the bottle arrival sensor S1, the input signal IN2 of the cap detection sensor S2, the input signal IN3 of the liquid volume determination sensor S3, the input signal IN4 of the label detection sensor S4, and the input signal IN5 of the label determination sensor S5 are all H ("H" will be used to represent high signal level and "L" will be used to represent low signal level, consistently throughout this specification), while the input signals IN6 through IN8 of the remaining three sensors S6 through S8 all are L and remain so throughout the action. In other words, the levels of the input signals IN1 through IN8 at this time are:

H,H,H,H,H,L,L,L.

In this case, everything is normal, and therefore only the output signal OUT1 indicating the normal operational condition is outputted to the light emitting diode LED1, which is the only one of the light emitting diodes LEDn which is lighted up.

In other words, the levels of the output signals OUT1 through OUT8 at this time are:

H,L,L,L,L,L,L,L.

When the timer count is finished in step #6 of the FIG. 3 flow chart, a stop signal ST is outputted, and the output signal OUT is changed to the L level so that the light emitting diode LED1 is turned off.

During the second exemplary operational episode, i.e. during the exemplary time interval T2 in which exemplary case a bottle 11 is to be inspected which in fact has a missing cap 12, at the rising edge of the input signal IN1 from the bottle arrival sensor S1, the input signal IN2 from the cap detection sensor S2 is exemplarily at the L level. The two pulses of relatively small widths included in the exemplary input signal IN2 are caused by reflection of light from the mouth of the bottle 11, and are not particularly detected because they are offset from the rising edge of the input signal IN1. The other input signals IN3 through IN8 are identical to those received during the time interval T1, already explained.

In other words, the levels of the input signals IN1 through IN8 are:

H,L,H,H,H,L,L,L.

In this case, according to the fact that the cap 12 is missing from this bottle 11, only the output OUT2 indicating the missing cap 12 is outputted, and only the light emitting diode LED2 is lighted up.

In other words, the levels of the output signals OUT1 through OUT8 at this time are:

L,H,L,L,L,L,L,L.

During the third exemplary operational episode, i.e. during the exemplary time interval T3 in which exemplary case a bottle 11 is to be inspected which in fact has a low volume of liquid therein, at the rising edge of the input signal IN1 from the bottle arrival sensor S1, the input signal IN3 from the liquid volume determination sensor S3 is exemplarily at the L level. The other input signals IN2 and IN4 through IN8 are identical to those received during the time interval T1, already explained.

In other words, the levels of the inputs signals IN1 through IN8 are:

H,H,L,H,H,L,L,L.

In this case, according to the fact that the liquid volume in this bottle 11 is low, only the output OUT3 indicating the low liquid volume is outputted, and only the light emitting diode LED3 is lighted up.

In other words, the levels of the output signals OUT1 through OUT8 at this time are:

L,L,H,L,L,L,L,L.

During the fourth exemplary operational episode, i.e. during the exemplary time interval T4 in which exemplary case a bottle 11 is to be inspected which in fact does not have any label 13, at the rising edge of the input signal IN1 from the bottle arrival sensor S1, the input signal IN4 from the label detection sensor S4 is exemplarily at the L level. The other input signals IN2, IN3, and IN5 through IN8 are identical to those received during the time interval T1, already explained.

In other words, the levels of the input signals IN1 through IN8 are:

H,H,H,L,H,L,L,L.

In this case, according to the fact that the label 13 for this bottle 11 is missing, only the output OUT4 indicating the missing label is outputted, and only the light emitting diodes LED4 is lighted up.

In other words, the levels of the output signals OUT1 through OUT8 at this time are:

L,L,L,H,L,L,L,L.

During the fifth exemplary operational episode, i.e. during the exemplary time interval T5 in which exemplary case a bottle 11 is to be inspected on which in fact the label 13 is set at a crooked angle, at the rising edge of the input signal IN1 from the bottle arrival sensor S1, the input signal IN5 from the label determination sensor S5 is exemplarily at the L level. The other input signals IN2 through IN4 and IN6 through IN8 are identical to those received during the time interval T1, already explained.

In other words, the levels of the input signals IN1 through IN8 are:

H,H,H,H,L,L,L,L.

In this case, according to the fact that the label 13 for this bottle 11 is improperly attached, only the output OUT5 indicating the crooked label is outputted, and only the light emitting diode LED5 is lighted up.

In other words, the levels of the output signals OUT1 through OUT8 at this time are:

L,L,L,L,H,L,L,L.

The first control means, as defined in the claims operates according to OR logic. In other words, considering the sixth exemplary operational episode, i.e. during the exemplary time interval T6 in which exemplary case a bottle 11 is to be inspected on which in fact both the cap 12 is missing and also the label 13 is missing, at the rising edge of the input signal IN1 from the bottle arrival sensor S1, the input signal IN2 from the cap detection sensor S2 is exemplarily at the L level, and simultaneously also the input signal IN3 from the liquid volume determination sensor S3 is exemplarily at the L level. The other input signals IN4 through IN8 are identical to those received during the time interval T1, already explained.

In other words, the levels of the input signals IN1 through IN8 are:

H,L,L,H,H,L,L,L.

In this case, according to the fact that the cap 12 on this bottle 11 is missing and also the liquid level thereof is low, both the output OUT2 indicating the missing cap and also the output OUT3 indicating the low liquid level are outputted, and both the light emitting diodes LED2 and LED3 are lit up.

In other words, the levels of the output signals OUT1 through OUT8 at this time are:

L,H,H,L,L,L,L,L.

AUTOMATIC PROGRAMMING DURING LEARNING OPERATION

Figure 6:
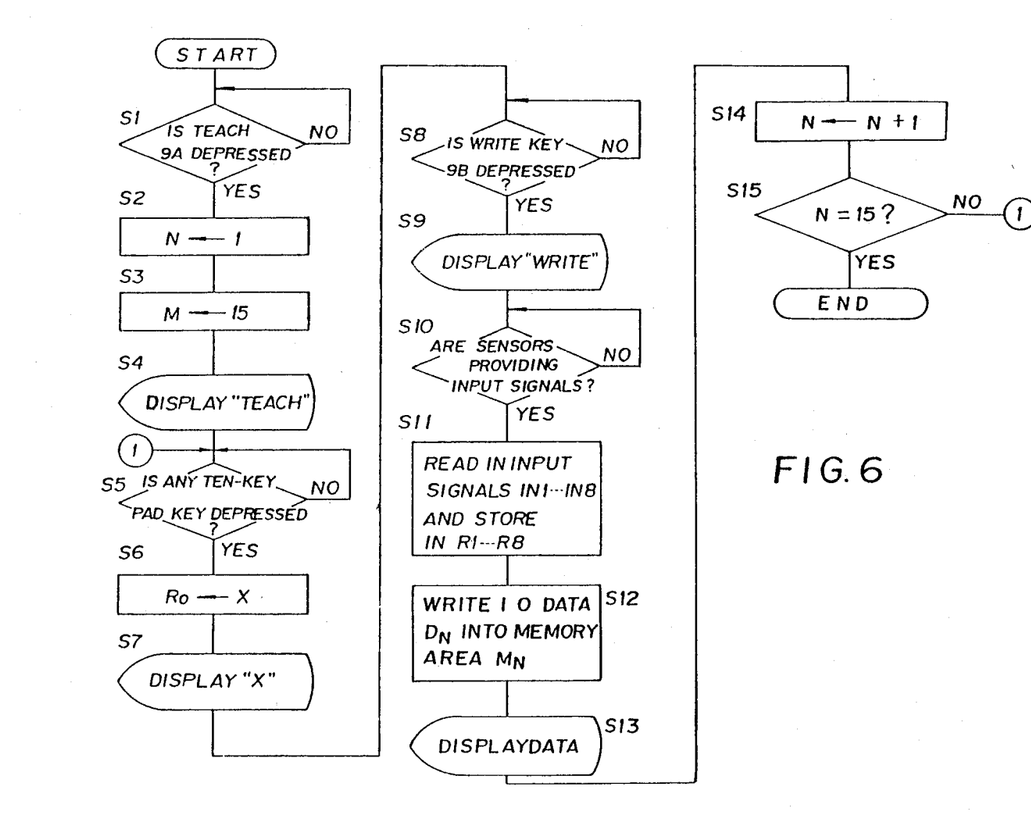
FIG. 6 is a partial flow chart, for illustrating another portion of the program stored in and obeyed by the microcomputer incorporated in the first preferred embodiment inspection controller of FIG. 1, during learning operation while it is being taught.

Next, in FIG. 6, a fragmentary flow chart is shown for a portion of the aforementioned control program which directs the operation of the central processing unit 2 during learning operation, according to this first preferred embodiment of the inspection controller of the present invention. This flow chart will now be explained. It should be understood that, as before, the actual steps of the program executed by the central processing unit 2 for implementing this flow chart are not particularly disclosed in this specification; again, such programming may be performed in a per se conventional way according to the flow chart of FIG. 6, and no particular details thereof are shown or suggested in this specification, since various possibilities for the details thereof can be easily supplemented, as appropriate, by one of ordinary skill in the programming arts, when based upon the functional disclosures set out in this specification.

First of all, the mode selection switch 7 is set to the "SET" position, and this starts the action of the FIG. 6 program at the decision step S1.

In this decision step S1, a decision is made as to whether or not the teach key 9a is currently being depressed, or not. If the result of this decision is NO, so that the teach key 9a is not currently depressed, then the flow of control cycles round again to this decision step S1 in a tight loop; but, if the result of this decision is YES, so that in fact now the teach key 9a is being depressed, then the flow of control passes next to the step S2.

In the step S2, the value of a register N is set to unity, and then the flow of control passes next to the step S3.

In case of abnormality (a missing cap 12 on a bottle 11, an improper filling volume for a bottle 11, or a missing or improper label 13 on said bottle 11), in the step S3 the number 15 of possible combinations of abnormalities is set as the value of a register M, and then the flow of control passes next to the step S4.

In the step S4, an indication "TEACH" is displayed on the LCD type display 8, and then the flow of control passes next to the decision step S5.

In this decision step S5, a decision is made as to whether any one of the ten keys 10a through 10j on the ten key pad 10 is currently being depressed, or not. If the result of this decision is NO, so that none of the ten keys 10a through 10j is currently being depressed, then the flow of control cycles round again to this decision step S5 in a tight loop; but, if the result of this decision is YES, so that in fact now (at least) one of the ten keys 10a through 10j is currently being depressed, then the flow of control passes next to the step S6. Hereinafter, it will be exemplarily assumed that it is the "1" key 10a which is depressed.

In step S6, then, a numerical value X corresponding to the depressed key—in this exemplary case 1—is loaded into a register R0, and then the flow of control passes next to step S7. And in this step S7 this numerical value X—in this exemplary case 1—is indicated next to the decision step S8.

In this decision step S8, a decision is made as to whether the write key 9b is currently being depressed or not. If the result of this decision is NO, so that the write key 9b is not in fact currently being depressed, then the flow of control cycles round again to this decision step S8 in a tight loop; but, if the result of this decision is YES, so that in fact now the write key 9b is currently being depressed, then the flow of control passes next to step S9.

In step S9, an indication "WRITE" is displayed on the LCD type display 8, and then the flow of control passes next to the decision step S10.

In this decision step S10, a decision is made as to whether the input signals IN1 through IN8 are currently being inputted from the sensors S1 through S8 or not. If the result of this decision is NO, so that the input signals IN1 through IN8 are not being currently inputted, then the flow of control cycles round again to this decision step S10 in a tight loop; but, if the result of this decision is YES, so that in fact now the input signals IN1 through IN8 are being currently inputted, then the flow of control passes next to step S11.

Since the ten key pad key 10a corresponding to the normal condition is being pressed, a bottle 11 which has no defect is conveyed on the belt conveyor 14 for executing a learning operation.

In step S11, the input signals IN1 through IN8 are read from the respective sensors S1 through S8, and their values are stored in the corresponding registers R1 through R8, and then the flow of control passes next to step S12. At this time, as mentioned earlier, the levels of the input signals IN1 through IN8 are:

H,H,H,H,H,L,L,L.

In step S12, the I/O data Dn (=D1="1", H, H, H, H, H, L, L, L) is written into the memory area Mn (=M1) of the RAM 4, and then the flow of control passes next to the step S13.

In this step S13, the terminal number "01" for the I/O data Dn (=D1) and the number of the sensor "IN1" which has produced an input when the output is produced on that output terminal are displayed on the LCD type display 8 as "01IN1". This completes the programming of I/O data in the case of a bottle with no defect; and then the flow of control passes next to step S14.

In step S14, the register N is incremented by unity, so that now N is equal to 2; and then the flow of control passes next to the decision step S15.

In this decision step S15, a decision is made as to whether or not N is equal to 15. If the result of this decision is YES, so that now N is equal to 15, then the flow of control passes next to exit this program fragment, without doing anything further; but, if the result of this decision is NO, so that as yet N is not equal to 15, then the flow of control passes next to return via the label ((1)) to the decision step S5, detailed above. Since, in the operational episode which is being detailed, as yet N is not equal to 15, in this exemplary case the flow of control passes back next to the decision step S5.

In this decision step S5, suppose that it is the case that the operator has pressed the ten-key key corresponding to "2", i.e. the key 10b, to indicate a missing cap 12 for a bottle 11. In such a case, in the step S6, "2" is set into the register R0 (X=2), and, in the step S7, "2" is displayed on the LCD type display 8.

Subsequently the action of the steps S8 through S10 is conducted in the same manner.

Since the ten-key key "2" 10b corresponding to a missing cap 12 for a bottle 11 was pressed earlier, a bottle 11 which does not have a cap 12, but otherwise is normal and acceptable, is conveyed by the belt conveyor 14 for learning operation.

In step S11, as mentioned earlier, the data read out from the sensors S1 through S8 and set in the registers R1 through R8 is as follows:

H,L,H,H,H,L,L,L.

In the step S12, the I/O data Dn (=D2) written into the memory area Mn (=M2) of the RAM 4 is:

"2",H,L,H,H,H,L,L,L.

In step S13, the terminal number "02" for the I/O data Dn (=D2) and the number of the sensor "IN2" which has produced an input when the output is produced on that output terminal are displayed on the LCD type display 8 as "02 IN2". This completes the programming of I/O data in the case of a bottle 11 with a missing cap 12 as defect; and then, as before, the flow of control passes next to step S14.

In step S14, as before, the register N is incremented by unity, so that now N is equal to 3; and then the flow of control passes next to the decision step S15.

In this decision step S15, as before, a decision is made as to whether or not N is equal to 15. Since, in the operational episode which is being detailed, as yet N is not equal to 15, in this exemplary case the flow of control next passes back again to the decision step S5.

In the next cycle, in the decision step S5, suppose that it is now the case that the operator has pressed the ten-key key corresponding to "3", i.e. the key 10c, to indicate a low liquid level for a bottle 11. In such a case, in step S6, "3" is set into the register R0 (X=3), and, in step S7, "3" is displayed on the LCD type display 8. Subsequently the action of steps S8 through S10 is conducted in the same manner: since the ten-key key "3" 10c corresponding to a low liquid level for a bottle 11 has been pressed, a bottle 11 which has a low fluid level but otherwise is normal and acceptable is conveyed by the belt conveyor 14 for learning operation. And, in step S12, the I/O data Dn (=D3) written into the memory area Mn (=M3) of the TAM 4, to thus correspond to improper liquid volume, is:

"3",H,H,L,H,H,L,L,L.

As before, in step S13, the terminal number "03" for the I/O data Dn (=D3) and the number of the sensor "IN3" which has produced an input when the output is produced on that output terminal are displayed on the LCD type display 8 as "03 IN3". This completes the programming of I/O data in the case of a bottle 11 with a low fluid level as defect; and then, as before, the flow of control passes next to step S14.

In the next cycle, in the decision step S5, suppose that it is now the case that the operator has pressed the ten-key key corresponding to "4", i.e. the key 10d, to indicate a missing label 13 for a bottle 11. In such a case, in the step S6, "4" is set into the register R0 (X=4), and, in the step S7, "4" is displayed on the LCD type display 8. Subsequently, the action of the steps S8 through S10 is conducted in the same manner: since the ten-key key "4" 10d corresponding to a missing label 13 for a bottle 11 has been pressed, a bottle 11 which has a missing label but otherwise is normal and acceptable is conveyed by the belt conveyor 14 for a learning operation. And, in the step S12, the I/O data Dn (=D4) written into the memory area Mn (=M4) of the RM 4, to thus correspond to a missing label, is:

"4",H,H,H,L,H,L,L,L.

As before, in the step S13, the terminal number "04" for the I/O data Dn (=D4) and the number of the sensor "IN4" which has produced an input when the output is produced on that output terminal are displayed on the LCD type display 8 as "04 IN4". This completes the programming of I/O data in the case of a bottle 11 with a missing label as defect; and then, as before, the flow of control passes next to step S14.

In the next cycle, in the decision step S5, suppose that it is now the case that the operator has pressed the ten-key key corresponding to "5", i.e. the key 10e, to indicate a skewed label 13 for a bottle 11. In such a case, in step S6, "5" is set into the register R0 (X=5), and, in step S7, "5" is displayed on the LCD type display 8. Subsequently, the action of steps S8 through S10 is conducted in the same manner: since the ten-key key "5" 10e corresponding to a skewed label 13 for a bottle 11 has been pressed, a bottle 11 which has a skewed label but otherwise is normal and acceptable is conveyed by the belt conveyor 14 for learning operation. And, in step S12, the I/O data Dn (=D5) written into the memory area Mn (=M5) of the RAM 4, to thus correspond to a skewed label, is:

"5",H,H,H,H,L,L,L,L.

As before, in step S13, the terminal number "05" for the I/O data Dn (=D5) and the number of the sensor "IN5" which has produced an input when the output is produced on that output terminal are displayed on the LCD type display 8 as "05 IN5". This completes the programming of I/O data in the case of a bottle 11 with a skewed label as the defect; and then, as before, the flow of control passes next to step S14.

In the next cycle, in the decision step S5, suppose that it is now the case that the operator has pressed the ten-key key corresponding to "6", i.e. the key 10f, to indicate a missing cap 12 and also a low liquid level for a bottle 11. In such a case, in step S6, "6" is set into the register R0 (X=6), and, in step S7, "6" is displayed on the LCD type display 8. Subsequently, the action of steps S8 through S10 is conducted in the same manner: since the ten-key key "6" 10f corresponding to a missing cap 12 and also a low liquid level for a bottle 11 has been pressed, a bottle 11 which has a missing cap 12 and also a low liquid level but otherwise is normal and acceptable is conveyed by the belt conveyor 14 for learning operation. And, in step S12, the I/O data Dn (=D6) written into the memory area Mn (=M6) of the RAM 4, to thus correspond to a missing cap and also a low liquid level, is:

"6",H,L,L,H,H,L,L,L.

As before, in the step S13, the terminal number "06" for the I/O data Dn (=D6) and the number of the sensor "IN6" which has produced an input when the output is produced on that output terminal are displayed on the LCD type display 8 as "06 IN6". This completes the programming of I/O data in the case of a bottle 11 with a missing cap and also a low liquid level as the defect; and then, as before, the flow of control passes next to step S14.

Thereafter, the programming of I/O data is conducted for each of the other combinations of defects in a similar manner.

When the programming of all of the combinations has been completed, the incrementing by unity of the register N in step S14 causes N to become equal to 15, and thereafter in the decision step S15, it is determined that in fact N is equal to 15, and thus the process is terminated.

THE SECOND PREFERRED EMBODIMENT

The second preferred embodiment of the inspection controller of the present invention is physically constructed similarly to the first preferred embodiment detailed above, and hence detailed description of the construction thereof will be eschewed in the interests of brevity of explanation. The important difference between this second preferred embodiment and the first preferred embodiment described above relates to the operation during the learning operation, which, for this second preferred embodiment, is shown by the flow chart of FIG. 7 in a manner analogous to the FIG. 6 flow chart for the first preferred embodiment. Thus, in this case, the central processing unit 2 combines the functions of the first control means, the second control means, and the third control means. In other words, said central processing unit 2 includes: (1) the first control means, which has the operative function of selecting, as part of its actual operation, from the output states stored in the RAM 4 according to the data received from the sensors S1 through S8 and producing output on the output terminals corresponding to the output states; (2) the second control means, having the operative function of writing, as a part of automatic programming, the data from the sensors S1 through S8 and the output data for the output terminal as selected on the ten-key pad 10, so as to have a certain mutual association, into the RAM 4; (3) the teaching condition agreement determining means, for determining the agreement between the input data of the I/O data for writing consisting of the data from the sensors S1 through S8 and the output data on the output terminals as selected by the keys of the ten key pad with the input data of the I/O data already stored in the RAM 4, and in case of disagreement, for outputting an action signal for the second control means; and (4) a third control means for outputting an error signal in the case of an agreement result at the teaching condition agreement determining means, and for clearing the already stored and agreed I/O data from the RAM 4.

ACTION DURING ACTUAL OPERATION

This is substantially as described before with regard to the first preferred embodiment, and follows a flow chart akin to the FIG. 3 flow chart, and hence no particular description thereof will be given in the interests of conciseness of disclosure.

AUTOMATIC PROGRAMMING DURING LEARNING OPERATION

Figure 7:
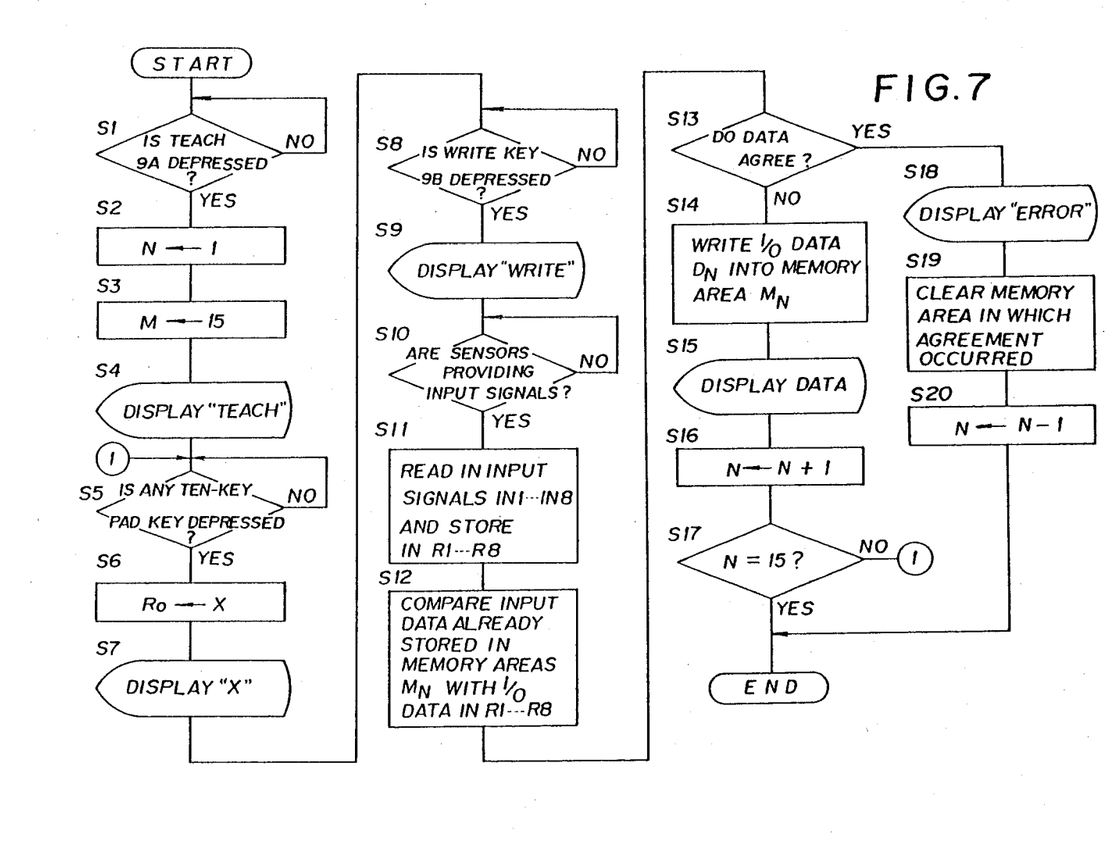
FIG. 7 is a partial flow chart, similar to FIG. 6 relating to the first preferred embodiment, for illustrating a similar portion of a program stored in and obeyed by a corresponding microcomputer incorporated in the second preferred embodiment of the inspection controller of the present invention, similarly during learing operation while it is being taught.

A fragmentary flow chart for the learning operation in this second preferred embodiment of the inspection controller of the present invention is shown in FIG. 7, which is likened to FIG. 6 for the first preferred embodiment. In this second preferred embodiment, the learning operation has two phases: when no redundancy exists in the input data and when some redundancy occurs in the input data. This flow chart will now be explained. It should be understood that, as before, the actual steps of the program obeyed by the central processing unit 2 for implementing this flow chart are not particularly disclosed in this specification; again, such programming may be performed in a per se conventional way according to the flow chart of FIG. 7, and no particular details thereof are shown or suggested in this specification, since various possibilities for the details thereof can be easily supplemented, as appropriate, by one of ordinary skill in the programming arts when based upon the functional disclosures set out in this specification.

WHEN THE INPUT DATA IS NOT REDUNDANT

In this first case, first of all, the mode selection switch 7 is set to the "SET" position, and this starts the action of the FIG. 7 program at the decision step S1.

In this decision step S1, a decision is made as to whether or not the teach key 9a is currently being depressed, or not. If the result of this decision is NO, so that the teach key 9a is not currently depressed, then the flow of control cycles round again to this decision step S1 in a tight loop; but, if the result of this decision is YES, so that in fact now the teach key 9a is being depressed, then the flow of control passes next to step S2.

In step S2, the value of a register N is set to unity, and then the flow of control passes next to step S3.

In case of abnormality (a missing cap 12 on a bottle 11, an improper filling volume for a bottle 11, or a missing or improper label 13 on a bottle 11), in step S3 the number 15 of possible combinations of abnormalities is set as the value of a register M, and then the flow of control passes next to step S4.

In step S4, an indication "TEACH" is displayed on the LCD type display 8, and then the flow of control passes next to the decision step S5.

In this decision step S5, a decision is made as to whether any one of the ten keys 10a through 10j on the ten key pad 10 is currently being depressed or not. If the result of this decision is NO, so that none of the ten keys 10a through 10j is currently being depressed, then the flow of control cycles round again to this decision step S5 in a tight loop; but, if the result of this decision is YES, so that in fact now (at least) one of the ten keys 10a through 10j is currently being depressed, then the flow of control passes next to step S6. Hereinafter, it will be exemplarily assumed that it is the "1" key 10a corresponding to the output signal OUT1 which is depressed.

In step S6, then, a numerical value X corresponding to the depressed key—in this exemplary case 1—is loaded into a register R0, and then the flow of control passes next to step S7. And in this step S7, this numerical value X—in this exemplary case 1—is indicated on the LCD type display 8, and then the flow of control passes next to the decision step S8.

In this decision step S8, a decision is made as to whether the write key 9b is currently being depressed or not. If the result of this decision is NO, so that the write key 9b is not in fact currently being depressed, then the flow of control cycles round again to this decision step S8 in a tight loop; but, if the result of this decision is YES, so that in fact now the write key 9b is currently being depressed, then the flow of control passes next to step S9.

In steps S9, an indication "WRITE" is displayed on the LCD type display 8, and then the flow of control passes next to the decision step S10.

In this decision step S10, a decision is made as to whether the input signals IN1 through IN8 are currently being inputted from the sensors S1 through S8 or not. If the result of this decision is NO, so that the input signals IN1 through IN8 are not being currently inputted, then the flow of control cycles round again to this decision step S10 in a tight loop; but, if the result of this decision is YES, so that in fact now the input signals IN1 through IN8 are being currently inputted, then the flow of control passes next to step S11.

Since the ten-key pad key 10a corresponding to the normal condition is being pressed, a bottle 11 which has no defect is conveyed on the belt conveyor 14 for executing a learning operation.

In step S11, the input signals IN1 through IN8 are red from the respective sensors S1 through S8, and their value are stored in the corresponding register R1 through R8, and then the flow of control passes next to the step S12. At this time, as mentioned earlier, the levels of the input signals IN1 through IN8 are:

H,H,H,H,H,L,L,L.

In step S12, the input data of the I/O data which is already stored in a certain memory area Mn (n=1, 2, 3. ...) of the RAM 4 is compared with the I/O data stored in the registers R1 through R8. Then the flow of control passes next to the decision step S13.

In the decision step S13, a decision is made as to whether or not these data agree. If the result of this decision is YES, so that the data have already been recorded, then the flow of control passes next to step S18; but, if the result of this decision is NO, so that the data are not redundant, then the flow of control passes next to step S14. In this exemplary case, since this is the first programming step and the contents of the memory area Mn (=M1) are typically L, L, L, L, L, L, L, L, therefore in this first case, the flow of control does pass to step S14.

In step S14, the I/O data Dn (=D1="1", H, H, H, H, H, L, L, L) Is written into the memory area Mn (=M1) of the RAM 4, and then the flow of control passes next to step S15.

In step S15, the output terminal number "01" for the I/O data Dn (=D1) and the number of the sensor "IN1" which has produced an input when the output is produced on that output terminal are displayed on the LCD type display 8 as "01 IN1". This completes the programming of I/O data in the case of a bottle with no defect, and then the flow of control passes next to step S16.

In step S16, the register N is incremented by unity, so that now N is equal to 2; and then the flow of control passes next to the decision step S17.

In this decision step S17, a decision is made as to whether or not N is equal to 15. If the result of this decision is YES, so that now N is equal to 15, then the flow of control passes next to exit this program fragment without doing anything further; but, if the result of this decision is NO, so that as yet N is not equal to 15, then the flow of control passes next to return via the label ((1)) to the decision step S5, detailed above. Since, in the operational episode which is being detailed, as yet N is not equal to 15, in this exemplary case the flow of control passes back next to the decision step S5.

In this decision step S5, suppose that it is the case that the operator has pressed the ten-key key corresponding to "2", i.e. the key 10b, to indicate a missing cap 12 for a bottle 11. In such as case, in the step S6, "2" is set into the register R0 (X=2), and, in the step S7, "2" is displayed on the LCD type display 8.

Subsequently, the action of the steps S8 and S9 is conducted in the same manner.

Since the ten-key key "2" 10b corresponding to a missing cap 12 for a bottle 11 was pressed earlier, a bottle 11 which does not have a cap 12 but otherwise is normal and acceptable is conveyed by the belt conveyor 14 for learning operation.

In the step S10, the system flow waits for the input from the sensors S1 through S8; and then, in the step S11, as mentioned earlier, the data read out from the sensors S1 through S8 and set in the registers R1 through R8 is as follows:

H,L,H,H,H,L,L,L.

In step S12, the input data already stored in any part of the memory areas Mn (n=1, 2, ....) is compared with the I/O data stored in the registers R1 through R8, in a similar manner to the previously explained case, and then the flow of control passes next to the decision step S13. In this step S13, the agreement or disagreement between the two sets of input data is determined. In this case, also, a disagreement is determined. As a result, the flow of control passes to step S14.

In step S14, the I/O data Dn (=D2) written into the memory area Mn (=M2) of the RAM 4 is:

"2",H,L,H,H,H,L,L,L.

In step S15, the terminal number "02" for the I/O data Dn (=D2) and the number of the sensor "IN2" which has produced an input when the output is produced on that output terminal are displayed on the LCD type display 8 as "02 IN2". This completes the programming of I/O data in the case of a bottle 11 with a missing cap 12 as defect; and then as before the flow of control passes next to step S16.

In step S16, as before, the register N is incremented by unity, so that now N is equal to 3; and then the flow of control passes next to the decision step S17.

In this decision step S17, as before, a decision is made as to whether or not N is equal to 15. Since, in the operational episode which is being detailed, as yet N is not equal to 15, in this exemplary case the flow of control next passes back again to the decision step S5.

In the next cycle, in the decision step S5, suppose that it is now the case that the operator has pressed the ten-key key corresponding to "3", i.e. the key 10c, to indicate a low liquid level for a bottle 11. In such a case, in step S6, "3" is set into the register R0 (X=3), and, in step S7, "3" is displayed on the LCD type display 8. Subsequently, the action of steps S8 through S10 is conducted in the same manner: since the ten-key key "3" 10c corresponding to a low liquid level for a bottle 11 has been pressed, a bottle 11 which has a low fluid level but otherwise is normal and acceptable is conveyed by the belt conveyor 14 for learning operation. In step 11, as mentioned earlier, the levels of the input signals IN1 through IN8 are:

H,H,L,H,H,L,L,L.

In step S12, the input data already stored in any part of the memory areas Mn (n=1, 2, ...) is compared with the I/O data stored in the registers R1 through R8, in a similar manner to the previously explained cases, and then the flow of control passes next to the decision step S13. In this step S13, the agreement or disagreement between the two sets of input data is determined. In this case, also, a disagreement is determined. As a result, the flow of control passes to step S14.

In this step S14, the I/O data Dn (=D3) written into the memory area Mn (=M3) of the RAM 4, to thus correspond to improper liquid volume, is:

"3",H,H,L,H,H,L,L,L.

As before, in step S15, the terminal number "03" for the I/O data Dn (=D3) and the number of the sensor "IN3" which has produced an input when the output is produced on that output terminal are displayed on the LCD type display 8 as "03 IN3". This completes the programming of I/O data in the case of a bottle 11 with a low fluid level as defect; and then as before the flow of control passes next to step S16, and thence to step S5 by way of step S17.

In the next cycle, in the decision step S5, suppose that it is now the case that the operator has pressed the ten-key key corresponding to "4", i.e. the key 10d, to indicate a missing label 13 for a bottle 11. In such a case, in step S6, "4" is set into the register R0 (X=4), and, in step S7, "4" is displayed on the LCD type display 8. Subsequently, the action of steps S8 through S10 is conducted in the same manner: since the ten-key key "4" 10d corresponding to a missing label 13 for a bottle 11 has been pressed, a bottle 11 which has a missing label but otherwise is normal and acceptable is conveyed by the belt conveyor 14 for learning operation. Thus, in step S11, as mentioned earlier, the input signals IN1 through IN8 are as follows:

H,H,H,L,H,L,L,L.

And, in step S12, the input data already stored in any part of the memory areas Mn (n=1, 2, ....) is compared with the I/O data stored in the registers R1 through R8, in a similar manner to the previously explained cases, and then the flow of control passes next to the decision step S13. In this step S13, the agreement or disagreement between the two sets of input data is determined. In this case, also, a disagreement is determined. As a result, the flow of control passes to step S14.

In step S14, the I/O data Dn (=D4) written into the memory area Mn (=M4) of the RAM 4, to thus correspond to a missing label, is:

"4",H,H,H,L,H,L,L,L.

As before, in step S15, the terminal number "04" for the I/O data Dn (=D4) and the number of the sensor "IN4" which has produced an input when the output is produced on that output terminal are displayed on the LCD type display 8 as "04 IN4". This completes the programming of I/O data in the case of a bottle 11 with a missing label as a defect; and then, as before, the flow of control passes next to step S16, and back to step S5 via step S16 and step S17.

In the next cycle, in the decision step S5, suppose that it is now the case that the operator has pressed the ten-key corresponding to "5", i.e. the key 10e, to indicate a skewed label 13 for a bottle 11. In such a case, in step S6, "5" is set into the register R) (X=5), and, in step S7, "5" is displayed on the LCD type display 8. Subsequently, the action of steps S8 through S10 is conducted in the same manner: since the ten-key key "5" 10e corresponding to a skewed label 13 for a bottle 11 has been pressed, a bottle 11 which has a skewed label but otherwise is normal and acceptable is conveyed by the belt conveyor 14 for learning operation. Thus, step S11, as mentioned earlier, the input signals IN1 through IN8 are as follows:

H,H,H,H,L,L,L,L.

And, in step S12, the input data already stored in any part of the memory areas Mn (n=1, 2, ....) is compared with the I/O data stored in this registers R1 through R8, in a similar manner to the previously explained case, and then the flow of control passes next to the decision step S13. In this step S13, the agreeeement or disagreement between the two sets of input data is determined. In this case, also, a disagreement is determined. As a result, the flow of control passes to step S14.

In step S14, the I/O data Dn (=D5) written into the memory area Mn (=M5) of the RAM 4, to thus correspond to a skewed label, is:

"5",H,H,H,H,L,L,L,L.

As before, in step S15, the terminal number "05" for the I/O data Dn )=D5) and the number of the sensor "IN5" which has produced an input when the output is produced on that output terminal are displayed on the LCD type display 8 as "05 IN5". This completes the programming of I/O data in the case of a bottle 11 with a skewed label as a defect; and then, as before, the flow of control passes next to step S16 and back to the decision step S5 via step S17.

In the next cycle, in the decision step S5, suppose that it is now the case that the operator has pressed the ten-key key corresponding to "6", i.e. the key 10f, to indicate a missing cap 12 and also a low liquid level for a bottle 11. In such a case, in step S6, "6" is set into the register R0 (X=6), and, in step S7, "6" is displayed on the LCD type display 8. Subsequently, the action of steps S8 through S10 is conducted in the same manner: since the ten-key key "6" 10f corresponding to a missing cap 12 and also a low liquid level for a bottle 11 has been pressed, a bottle 11 which has a missing cap 12 and also a low liquid level but otherwise is normal and acceptable is step S14, the I/O data Dn (=D6) written into the memory area Mn (=M6) of the RAM 4, to thus correspond to a missing cap and also a low liquid level, is:

"6",H,L,L,H,H,L,L,L.

As before, in the step S15, the terminal number "06" for the I/O data Dn (=D6) and the number of the sensor "IN6" which has produced an input when the output is produced on that output terminal are displayed on the LCD type display 8 as "06 IN6". This completes the programming of I/O data in the case of a bottle 11 with a missing cap and also a low liquid level as a defect; and then, as before, the flow of control passes next to step S16 and back to step S5 via step S17.

Thereafter, the programming of I/O data is conducted for each of the other combinations of defects in a similar manner.

When the programming of all of the combinations has been completed, the incrementing by unity of the register N in the step S14 causes N to become equal to 15, and thereafter in the decision step S15, it is determined that in fact N is equal to 15, and thus the process is terminated.

This concludes the explanation of the operation when there is no redundancy in the I/O data.

WHEN THE INPUT DATA IS REDUNDANT

After completion of the programming of each I/O data or during the cycle subsequent to the programming of all the I/O data, for the purpose of assuring the accuracy of the programming process, or, in other words, ascertaining the properness of the mounting and of the sensitivity adjustment of the sensors S1 through S8, the learning operation may be repeated again.

In particular, the criteria for the properness of the liquid volume and the properness of the adjustment of the label 13 could, in principle, be very subtle.

Therefore, after the completion of the automatic programming by the learning operation involving the condition of proper liquid volume, a learning operation may be conducted with a bottle containing a liquid volume which is slightly different from the proper liquid volume.

In this case, "3" corresponding to the output signal OUT3 for improper liquid volume is inputted by pressing the key 10c on the ten key pad. In the step S11, the input signals IN1 through IN8 from the sensors S1 through S8 are read and are set in the corresponding registers R1 through R8. Suppose that the input signals IN1 through IN8 are as follows:

H,H,H,H,H,L,L,L     (2)

instead of:

H,H,L,H,H,L,L,L     (1)

In the case of (1), the light emitting diode LED3 should light up, while on the other hand in the case of (2), the light emitting diode LED1 should light up.

This is considered to be due to improper mounting or improper sensitivity adjustment of the sensors S1 to S8. Therefore, it is necessary to correct the mounting or the sensitivity adjustment of the sensors S1 to S8.

Thus, in step S12, the input data of the I/O data which is already stored in the RAM 4 is compared with the input data stored in the registers R1 to R8. In step S13, the agreement between the two sets of input data is determined. As a result, the flow of control advances to step S18, and "ERROR" is displayed on the display 8. In step S19, the memory area Mn of the RAM 4 is which the agreement of input data took place is cleared of the memory contents. In step S20, the content of the register N is decremented by unity.

After the mounting or the sensitivity adjustment of the sensors S1 to S8 is corrected, a similar learning operation is repeated.

A similar procedure is conducted for the case of an improper label.

When the programming of all the combinations is completed, incrementing by unity the content of the register N in step S16 causes N to become equal to 15. When in step S17 it is determined that the value of the register N has reached 15, the action is terminated.

CONCLUSION

Although the present invention has been shown and described in terms of the preferred embodiments thereof, and with reference to the appended drawings, it should not be considered as being particularly limited thereby since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. An object inspection controller comprising:
    a plurality of sensors for sensing predetermined characteristics of an object, and supplying a set of input signal states respectively corresponding to outputs of said sensors;
    a plurality of output terminals for supplying a set of output signal states representing said characteristics of said object;
    memory means for storing different sets of output signal states corresponding to different sets of input signal states;
    control means responsive to a set of input signal states for selecting from said memory a set of output signal states corresponding thereto and supplying said selected set of output signal states to said output terminals;
    means for commanding an automatic programming of predetermined sets of output signal states to correspond with predetermined sets of input signal states during a teaching mode;
    means, responsive to said commanding means, for receiving at least one set of input signal states from said sensors representing sensed characteristics of an object during said teaching mode;
    means, operative during said teaching mode, for storing said at least one set of input signal states received by said receiving means; and
    means, operative during said teaching mode, for causing said memory means to store a set of output signal states corresponding to each set of input signal states received by said receiving means and stored in said storing means.

2. The controller as defined in claim 1, further comprising:
    means for setting a characteristic of said object to be inspected during said teaching mode; and
    means for triggering the storing of said at least one set of input signal states and said sets of output states corresponding to said received sets of input signal states during said teaching mode.

3. The controller as defined in claim 2, wherein said triggering means includes a write key.

4. The controller as defined in claim 1, wherein said commanding means includes a teach key.

5. The controller as defined in claim 2, wherein said setting means includes a ten-key pad.

6. The controller as defined in claim 1, wherein said receiving means includes a register.

7. The controller as defined in claim 1, wherein said storage means is a memory.

8. The controller as defined in claim 1, further comprising:
    means for determining whether or not a set of received input signal states agrees with a set of input signal states already stored in said storage means; and
    means for writing said received set of input signal states into said storage means in response to a disagreement between said received set of input signal states and said set of already stored input signal states.

* * * * *